Feb. 1, 1927.
C. F. NELSON
1,616,326
TELEGRAPH SYSTEM
Filed Aug. 6, 1926   3 Sheets-Sheet 1
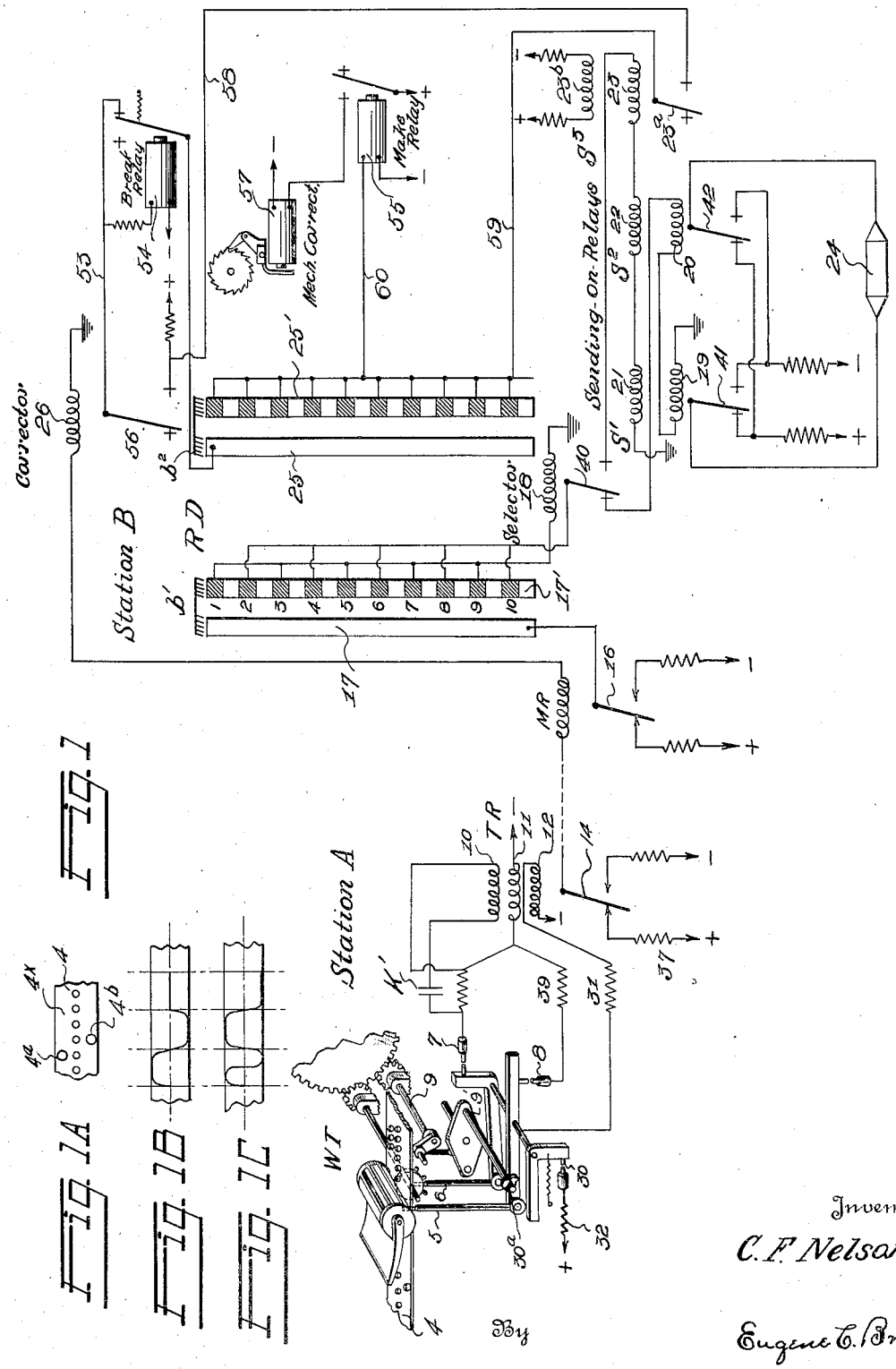
Inventor
C. F. Nelson
By Eugene C. Brown
Attorney

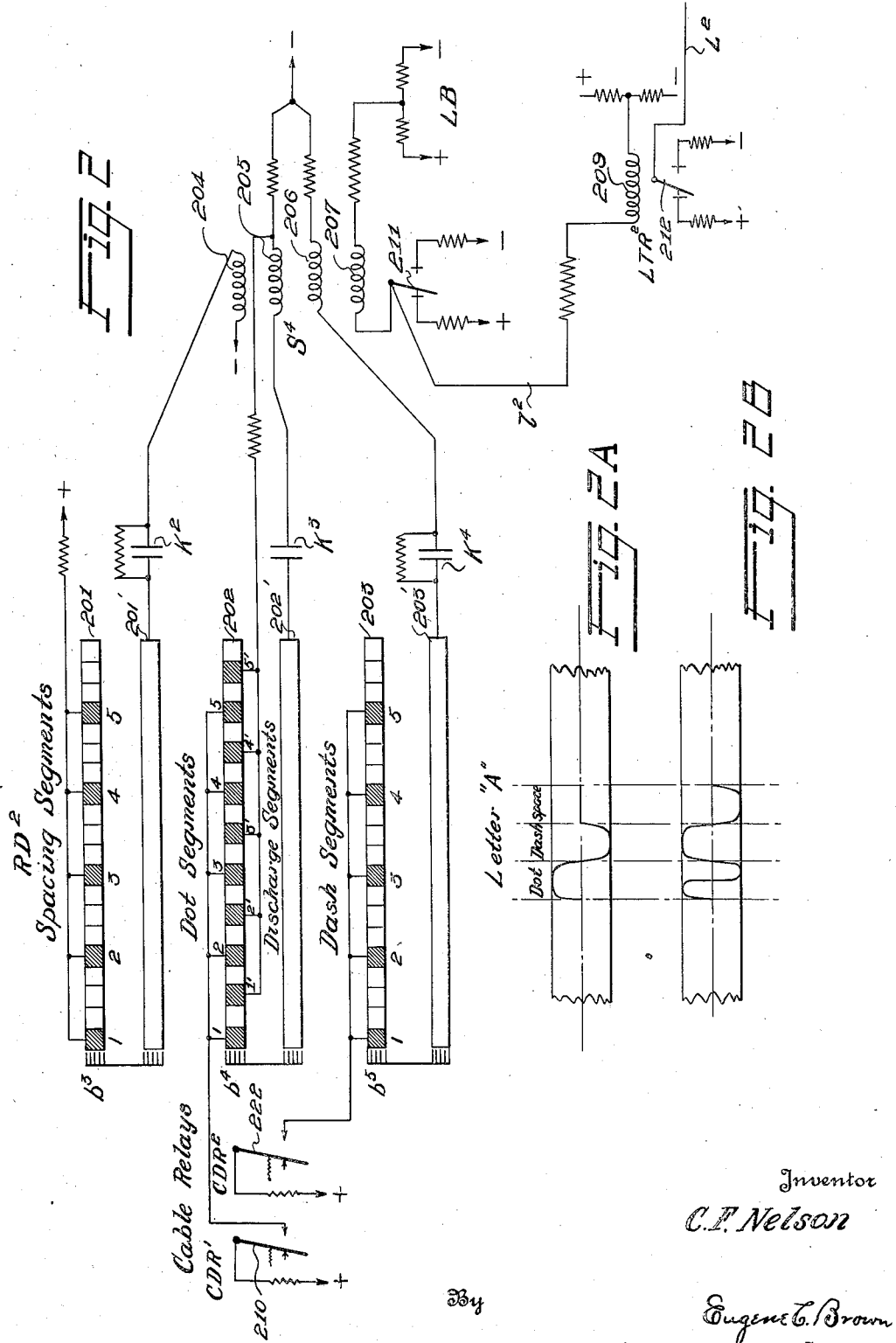

Feb. 1, 1927. 1,616,326
C. F. NELSON
TELEGRAPH SYSTEM
Filed Aug. 6, 1926  3 Sheets-Sheet 3
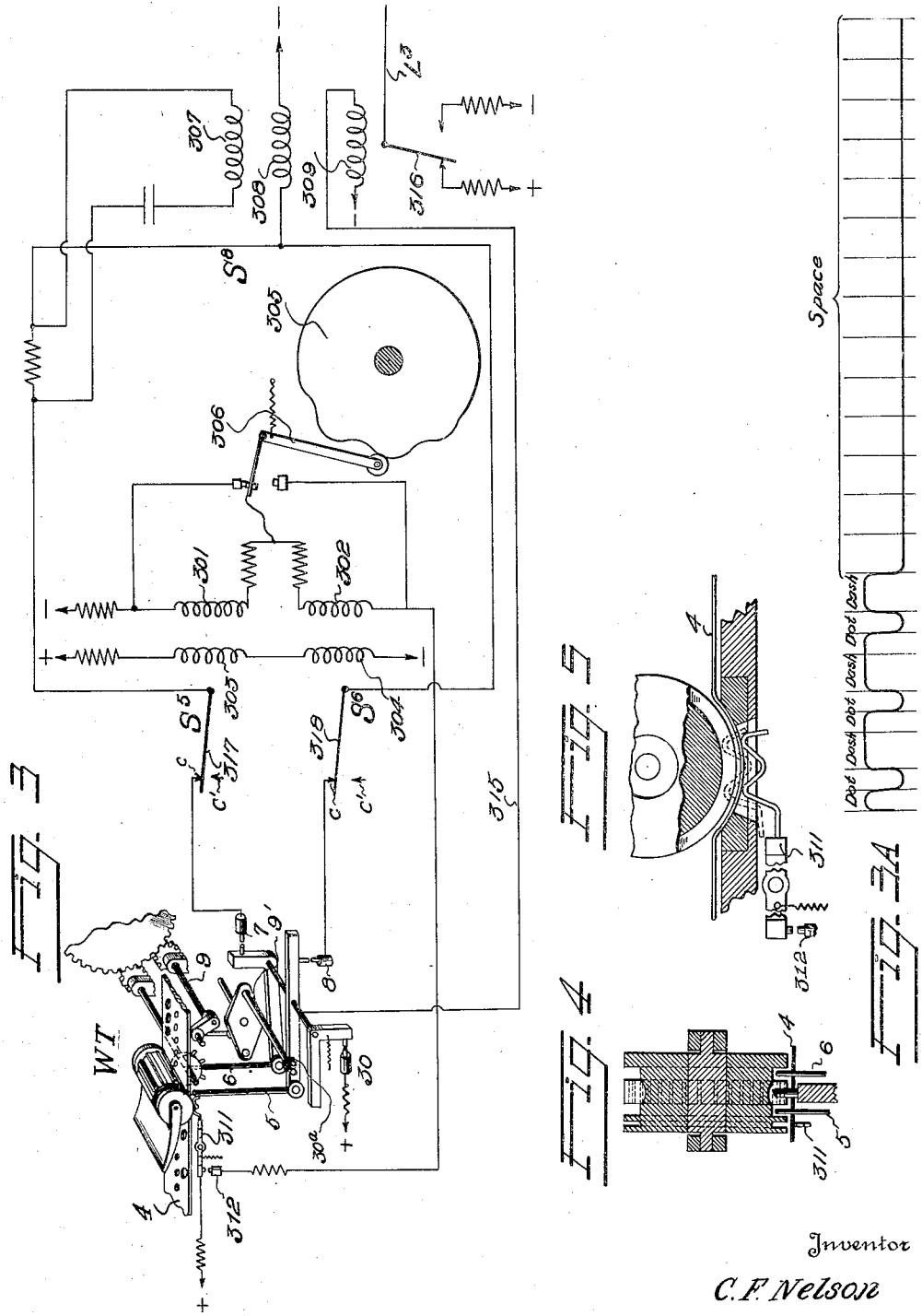
Inventor
C. F. Nelson
By
Eugene C. Brown
Attorney Patented Feb. 1, 1927.

1,616,326

UNITED STATES PATENT OFFICE.

CRESCENT F. NELSON, OF NEW DORP, NEW YORK, ASSIGNOR TO THE WESTERN UNION TELEGRAPH COMPANY, OF NEW YORK, N. Y., A CORPORATION OF NEW YORK.

TELEGRAPH SYSTEM.

Application filed August 6, 1926. Serial No. 127,674.

My invention relates to a telegraph code system employing signals of plus, minus and zero elements. Heretofore it has been found impractical to employ universal double current repeaters for operating the recorder in such a system due to the zero or no current element of the recorded code.

An object of this invention, therefore, is to provide certain arrangements whereby the three element recorder code signals of plus, minus and zero elements may be employed in a system in which the recorder code is operated through universal double current repeaters.

Another object of my invention is to provide means whereby the zero current element of a three element recorder code comprising plus, minus and zero elements is eliminated.

Another object of my invention is to provide means whereby a single dot signal is split up into two signals of plus and minus, and in this form transmitted to the line as a single complete cycle.

Another object of my invention is to provide means whereby the dash signal is transmitted as a single plus impulse, equal in length to two dot impulses, and a zero impulse is transmitted as a single minus impulse, equal in length to two dot impulses.

Another object of my invention is to provide means for maintaining two rotating members in synchronism employing a code in which the zero element of a three element recorder code is eliminated.

There are other objects of my invention which, together with the foregoing, will appear in the specification which follows.

In general my invention comprises an arrangement at the transmitter whereby the dot impulse is split up into a positive and a negative signal by means of a condenser discharge arrangement, a dash impulse is made equal to a single plus impulse equal in length to two dot impulses, and a zero impulse is translated into a single minus impulse equal in length to two dot impulses, and these are re-translated by means of a distributor at the distant station into the original plus, minus and zero code.

Referring to the drawings, Fig. 1 is a diagrammatic illustration showing the circuits at the transmitting and receiving stations employed in practicing my invention;

Figs. 1$^A$, 1$^B$ and 1$^C$ are detail views illustrating the tape perforations and the current waves transmitted;

Fig. 2 discloses a modified circuit arrangement for converting the cable code signals received over a submarine cable into double current signals;

Figs. 2$^A$ and 2$^B$ show the current waves;

Figs. 3, 4, and 5 disclose the circuit arrangements; and

Fig. 3$^A$ the current impulses transmitted for maintaining synchronism in my system when the tape has run out.

Referring more particularly to Fig. 1, the transmitter station A and the receiving station B are connected by a signalling line 3. The tape 4 operates through the feelers 5 and 6 of a tape transmitter WT of the well-known Wheatstone type, to selectively close contacts 7 and 8. The transmitter relay TR is provided with three windings 10, 11 and 12 for actuating the armature 14 to its right or left hand position for transmitting impulses over the line 3.

The circuits for the relay windings 10 and 11 are completed through contacts 7 and 8 respectively and through contact 30 which closes once during each revolution of the cam shaft 9. The contact 30 thus controls the transmission of the impulse to make it of a definite predetermined length, the details of which are described in the patent to Foley, No. 1,517,110. By adjusting the position of the cam 30$^a$ on the striker bar 9', contact 30 can be made to open at different times.

The main line relay MR at the distant station is responsive to the received impulses to operate its armature 16 to its right or left hand contact for repeating the impulses through the solid ring 17 and segmented ring 17' of the rotary distributer RD to operate the selecting relay 18. The windings 19 to 23 of the sending-on relays S' and S² and the automatic synchronizing relay S³ are responsive to these received impulses in a manner to be hereinafter described for controlling the code recorder 24 which may be a direct writer. The solid and segmented rings 25 and 25' of the rotary distributer operate in conjunction with the corrector relay 26 for maintaining the distributer in synchronism with the tape movement at the transmitting station A in a manner to be hereinafter described. The rotary distributers RD and RD² are of the well-known Baudot type having stationary rings and brushes rotated thereover by a motor (not shown) operating in synchronism with the transmitter at the sending station.

Referring now to Fig. 2, the distributer rings 201 to 203 of the rotary distributer RD² function to translate the three element recorder code into double current signals of plus and minus by operating the windings 204 to 207 of the local transmitting relay S⁴ in a manner hereinafter described for transmitting impulses over the conductor 208 to operate the line transmitting relay 209.

Referring to Fig. 3, the windings 301 to 304 are the energizing windings of synchronizing relays S⁵, S⁶, controlled by the cam member 305 through its contactor 306 for controlling the windings 307 to 309 of transmitting relay S⁸ for transmitting synchronous impulses when the tape 310 has run out and the cam member 311 closes its contact.

In order to better understand the invention a detailed description of the operations which take place when the code signal impulses are transmitted will be described. It will be assumed that the tape 4 (see Fig. 1) is so perforated as to transmit first a dot, then a dash, and finally a space signal. Normally it will be understood that upon every revolution of the cam shaft 9 of the Wheatstone transmitter WT, an energizing circuit is completed for the relay TR from the negative battery through the relay winding 12, resistor 31, closed contact 30 and resistor 32 to positive battery. This current, however, is overpowered when current flows in either of the other windings 10 or 11.

In order to transmit a dot impulse, the tape is so perforated that as the pin feelers are moved upwardly, the feeler 6 passes through a perforation 4ᵃ (see Fig. 1ᴬ), thereby closing the contact 7 and a circuit is completed from the positive battery through resistor 32, contact 30, through the contact 7 and through the relay winding 11 to negative battery. A parallel circuit is completed through the condenser K', relay winding 10, and through relay winding 11 to negative battery. The energized winding 11 causes the armature 14 to move against its left hand contact. A positive impulse is thus transmitted from positive battery, through the resistor 37, the left hand contact and armature 14, line 3, through the winding of main line relay MR at station B and winding of corrector relay 26 to return ground.

The contacts 7 and 8 are so adjusted that the circuit above traced for the relay windings 11 and 10, remains closed only for a length of time equal to one half of the duration of time allotted to a complete dot impulse. When this circuit is opened, the charged condenser K' discharges through the winding 10 in a reverse direction and this causes the armature 14 to move from its left hand to its right hand contact. An impulse is thus transmitted from negative battery through the right hand contact and armature 14, the line 3, to station B and through the windings of main line relay MR and corrector relay 26 to return ground. It will thus be seen that the dot impulse has now been translated into a cycle equal in length to the normal dot impulse, one half of which is a positive impulse and the remaining half a negative impulse.

As the tape continues to move according to our assumption, upon the next succeeding reciprocation of the pin feelers, the feeler 5 will pass through perforation 4ᵇ and thereby close the contacts at 8. An energizing circuit will thus be completed for the relay winding 11 from positive battery, through resistor 32, contact 30, contact 8, resistor 39 and relay winding 11 to negative battery. The relay winding 11 is energized and moves the armature 14 to its left hand contact, so that a circuit is completed over the line from positive battery through resistor 37, the left hand contact and armature 14, line 3, to station B, and through the relays 15 and 26. The armature 14 remains against its left hand contact for the full duration of time assigned to a dash impulse.

When a space impulse is to be transmitted there is no perforation to permit the pin feelers 5 and 6 to pass, as indicated at 4ˣ, and hence the contacts at 7 and 8 remain open. Upon the rotation of the cam shaft 9 however, the striker bar 9' moves upward and closes a circuit for the relay winding 12, from positive battery through resistor 32, the contact 30, resistor 31 and relay winding 12 to negative battery. The armature 14 is thereby moved to close its right hand contact and a negative impulse is transmitted from negative battery through the resistor, the right hand contact and armature 14, line 3, to station B, and the windings of relays 15 and 26 to the ground return.

From the above description it will be evident that the three element impulses of dot, dash and zero have been translated from the usual positive, negative and zero current impulses indicated in Fig. 1ᴮ, into a dot impulse comprising a positive half and a negative half, a dash impulse comprising a full length positive impulse and a zero impulse comprising a full length negative impulse as indicated in Fig. 1ᶜ. The manner in which these impulses are translated back into their original condition at the receiving end will now be described.

Upon the receipt of the first positive impulse comprising the first half of the dot cycle, the main line relay MR at station B is energized over a circuit previously traced, and the armature 16 is moved against its left hand contact. At this instant, the brush b' which rotates over the rings 17 and 17' of the rotary distributer is on its first segment and a circuit is therefore completed for the selecting relay 18 from the positive battery through the left hand contact and armature 16, the distributer ring 17, and rotating brush b', the first contact of the distributer and through the winding of selecting relay 18 to the return ground. The relay 18 is thus energized and moves its armature 40 to its left hand contact.

As the second half of the dot impulse is being received which, it will be recalled, was of a negative polarity, (see Fig. 1$^c$), the brush b' moves onto the second segment of the distributer ring 17'. This negative impulse received over the line 3 energizes the main line relay MR so as to move its armature 16 against its right hand contact. A circuit is thereby completed from the negative side of the battery through the right hand contact, and armature 16 and over the distributer ring 17, brush b' and its second segment, through the armature 40 and its left hand contact and thence through the windings of the sending-on relays S$^2$, S', to the return ground. The relay winding 19 is designed to be responsive to this negative impulse by operating the armature 41 to the right to complete a local circuit from the negative battery through the right hand contact and armature 41, through the recorder 24, the armature 42 and its left hand contact to positive battery. A dot impulse is thus recorded at 24.

The dash signal now arrives, consisting of a positive impulse having a full period duration and hence equal to the two half period dot impulses, (see Fig. 1$^c$). The first half or selecting position of the impulse will energize the relay MR and cause it to move its armature 16 against its left hand contact. At this instant the distributer brush b' is on its third segment and an energizing circuit will be completed for the selecting relay 18 similar to that heretofore traced. The relay 18 will therefore move its armature 40 to its left hand contact.

As the second or signaling portion of this dash impulse arrives, the distributer brush b' is on its fourth segment. The received impulse in this case being again positive, the armature 16 of the relay MR will remain against its left hand contact and a circuit will be completed for the windings 19 and 20 of the sending-on relays, similar to that heretofore traced except that this time the polarity of the impulse will be positive. As a result the relay winding 20, constructed to be responsive to a positive impulse, operates its armature 42 against its right hand contact, while armature 41 of the dot relay moves to its left hand contact so that it is recorded on recorder 24. The circuit for this impulse will be similar to that previously traced except that it is reversed in polarity.

The space signal now arrives, composed of two half period minus elements, i. e. a minus impulse equal to a full time period, (see Fig. 1$^c$). It will be remembered that a space impulse is sent by the transmitter WT when the pin feelers 5 and 6 strike an unperforated part of the tape so that the contacts at 7 and 8 remain open. An impulse is then sent over a circuit from positive battery through contact 30, resister 31 and relay winding 12 to negative battery. This causes the armature 14 of transmitter relay TR to move against its right hand contact and send a negative impulse over line 3 to station B. The armature 16 of main line relay MR moves against its right hand contact and this in turn operates the selecting relay 18 through segment 5 of ring 17', causing its armature 40 to move against its right hand contact. The second or signaling portion of the space signal being also negative in polarity, connects negative battery via armature 16 and segment 6 of ring 17' with windings 23, 22 and 21 of the automatic synchronizing relay S$^3$ and the dash relay S$^2$ and dot relay S', resepectively, thereby moving their armatures to their left hand or spacing contacts. In this case the recorder 24 is not energized, and hence a zero or space is recorded for the space signal. This completes the recording of the character A in the manner indicated at Fig. 1$^B$.

From the description thus far traced, it will be evident that the first impulse in each case is the selecting impulse, while the second impulse transmitted over the line from the sending to the receiving station is the signaling or marking element.

In cases where cable code signals are received over a submarine cable and are to be transmitted over an aerial or land line, a rotary distributer is provided for the purpose of translating the cable code signals into double current signals. In this instance, the rotary distributer functions in a manner similar to the tape transmitter of the Wheatstone type above described. The following is a description of the operation of this "cable distributer," which is illustrated diagrammatically in Fig. 2.

The rotary distributer RD$^2$ is the usual Baudot type in which the pairs of sol'd and segmented rings are stationary and the brushes are rotated thereover by a motor operating synchronously with the received signal impulses.

Let us assume that the cable code signal for the letter "A" shown in Fig. 2$^A$, is being received over the submarine cable by the cable relays CDR' and CDR$^2$ and is to be translated into the double current signal as shown in Fig. 2$^B$. When the dot impulse is received over the cable, the armature 210 of the dot cable relay CDR' moves against its right hand contact. At this instant, the brush $b^4$ is on dot segment 1 of ring 202 thus closing a circuit from positive battery, through armature 210, segment 1, brush $b^4$, solid ring 202', condenser K$^3$, and winding 205 of local transmitting relay S$^4$ to negative battery. This causes armature 211 to move to its left hand or positive battery contact. A slight locking current from battery LB holds the armature lightly against either of its contacts.

The next impulse received over the cable, is a dash impulse, which is a full length negative impulse, as indicated in Fig. 2$^A$. The dash cable relay CDR$^2$ responds and moves its armature 222 against its front or right hand contact, thus closing a circuit from positive battery, through armature 222, segment 3 of the dash ring 203, brush $b^3$, solid ring 203', condenser K$^4$ and winding 206 of the local transmitting relay S$^4$ to negative battery. The armature 211 moves against its left hand contact, and closes a circuit from positive battery, through armature 211, conductor 1$^2$, and winding 209 of line transmitting relay LTR$^2$. Accordingly, armature 212 moves against its left hand contact and sends a positive impulse over the line L$^2$. The condenser K$^4$ discharges through resistor 208 so that the armature 211 remains against its left hand contact while the brush $b^5$ passes over the three segments following segment 3, and hence a full length positive impulse, (equal in length to the two-element dot signal as indicated in Fig. 2$^B$) is transmitted over the line L$^2$. The dash cable relay now opens, so that both cable relays CDR' and CDR$^2$ are on their back contacts.

The next element of the letter "A" is a space or zero impulse, as indicated in Fig. 2$^A$. As above stated, the armatures of both cable relays are now on their back stops but as the brush $b^3$ moves onto segment 4 of the spacing ring 201 a circuit is closed from positive battery, through segment 4 of ring 201, brush $b^3$, solid ring 201', condenser K$^2$ and winding 204 of local transmitting relay S$^4$. This causes armature 211 to move over against its right hand contact where it remains until the next dot or dash signal is received. A negative impulse, (equal in length to the two-element dot signal), is therefore transmitted by the line transmitting relay LTR$^2$ over the line L$^2$. Hence the zero element received at the cable relays, as indicated in Fig. 2$^A$, is translated into a full length negative impulse, indicated in Fig. 2$^B$ and sent over the line L$^2$.

In connection with the functioning of the spacing rings 201, 201' and the brush $b^3$ moving thereover, it is evident that a positive impulse is sent through the relay winding 204 whenever the brush $b^3$ passes over one of the connected segments of the ring 201; but the winding 204 is so designed to be so weak that it has no effect upon the armature 211 when a current is flowing in any of the other coils of the relay. To this end the spacing condenser K$^2$ is made approximately one-third the capacity of the dot and dash condensers K$^3$ and K$^4$.

As the brush $b^4$ moves onto the discharge segment 1', the circuit just traced for the relay winding 205 is opened, and the condenser K$^3$ discharges itself via the brush $b^4$ and said segment 1', through said relay winding 205. This momentary reverse current through the relay winding causes the armature 211 to be moved to its right hand contact. This closes a circuit from positive battery through armature 211, conductor 1$^2$, and winding 209 of line transmitting relay LTR$^2$ to negative battery. Armature 212, therefore, moves against its right hand contact and sends a negative impulse over the line L$^2$. The single full length dot impulse indicated in Fig. 2$^A$ and received by the cable dot relay CDR' has thus been split into two half length impulses one positive and one negative, as indicated in Fig. 2$^B$ and transmitted into the line L$^2$.

In this manner not only may the three-element code signals received from the tape be translated into the double current code described, but likewise impulses of the three-element code type received over a cable may be translated for transmission over a signalling line.

Fig. 3 discloses the arrangement by which the double current code may be employed for transmitting synchronizing impulses when the tape has run out. The details of the tape operative cam mechanism disclosed in Fig. 3 have been previously described in the U. S. patent to Peterman No. 1,542,779 and hence need not be described in detail here.

Instead of connecting the contact members 7 and 8 directly to the windings 307 to 309 of the transmitting relay S$^8$, they are connected thereto through the contacts of the armatures 317 and 318 of synchronizing rings S$^5$ and S$^6$. Normally the armatures 317 and 318 are connected to their closed contacts $c$, by reason of the energization of the biasing windings 303 and 304 as shown.

Normally the tape 4 holds the lever away from its contact 312, but when the tape has run out, the lever arm 311 engages its contact 312 and circuits are prepared for the windings 301 and 302 of the synchronizing relays. With the lever 306 in the position shown, the winding 301 is shunted out in the obvious manner disclosed. As the cam member 305 rotates the lever member 306 closes its lower contact and the winding 302 is shunted out.

Upon the energization of the winding 302 at the instant when the winding 301 is shunted the armature 318 is moved to its lower contact $c'$. Upon the movement of the cam member so as to shunt the winding 302 the relay winding 301 is energized and moves the armature 317 to its lower contact $c'$. In this manner the windings 307 and 308 of transmitter relay $S^8$ are alternately energized to transmit to the line $L^3$ the dot and dash of the two element signals indicated in Fig. $3^A$.

When the lever 306 is on the smooth portion of the cam 305, the contact arm of the lever will be held in mid-position so that both relays $S^5$ and $S^6$ will be energized and their armatures 317 and 318 will be held on their open contacts $c'$. During this interval, a circuit is closed from positive battery, through contact 30, conductor 315, and winding 309 of transmitter relay $S^8$ which causes its armature 316 to move against its right hand contact, thereby sending a prolonged negative space impulse to line $L^3$, equal to 14 signal impulses as indicated in Fig. $3^A$.

The manner in which the brushes of the rotary distributers at the opposite ends of the line are maintained in synchronism and in exact phase relation is well known to those familiar with the operation of telegraph systems. It is fully described in U. S. patent to Yorke and Benjamin, 1,298,622, dated March 25, 1919. It is sufficient, therefore, to merely indicate diagrammatically the synchronizing elements and to briefly mention the operation.

According to the Yorke-Benjamin correction method, each current reversal affecting the correcting relay 26 affords an opportunity for correction, but the correction mechanism operates only when, at the time of one or more reversals, one distributer is sufficiently out of phase with respect to the other distributer, to require correction.

The armature of relay 26 vibrates in unison with the vibration of the armature 16 of main line relay MR. When the armature 56 moves against its right hand contact, a circuit is completed from positive battery through armature 56, conductor 53, and the winding of the break relay 54 to negative battery. A circuit is also closed from positive battery, through relay armature 56, conductor 53, back contact and armature of relay 54, to ring 25 of distributer RD, and thence through brush $b^2$, the connected segments of ring 25' and winding of the make relay 55 to negative battery. If, however, the brushes of the distributers are in proper phase relation, the brush $b^2$ will be over one of the insulated segments of the ring 25' at the instant of each completion of a circuit through conductor 53, and through the winding of relay 54 and before the brush $b^2$ can have passed on to one of the conductive segments of ring 25', relay 54 will have attracted its armature, thereby breaking the circuit to the ring 25, so that the magnet 55 will not be operated. But if at the instant the armature 56 completes a circuit through conductor 53, the brush $b^2$ is on one of the conductive segments of ring 25', (which will occur if the two distributers are not in exact proper phase relation), a circuit will be completed through the winding of the make relay 55. The armature of relay 55 will be attracted against its front contact, thus closing a circuit from positive battery through armature and front contact of relay 55, and the winding of the mechanical corrector magnet 57. The armature of magnet 57 actuates the corrector mechanism which steps the brushes of rotary distributer RD backward to bring them into proper phase relation with the brushes of the distributer at the opposite end of the line or cable.

If on account of line trouble or other cause, the brushes should become so far out of proper phase relation that with the transmitted signal impulses the selecting portions of the two-element characters are received when the brush $b'$ is on the even segments 2, 4, 6, etc., of the ring 17, instead of on the odd segments 1, 3, 5, etc., the armature 40 of the selector relay 18 will move to its right hand contact, thereby sending positive impulses to flow from the even segments through the winding 23 of the automatic synchronizing relay $S^3$, and causing its armature $23^a$ to move against its right hand contact. This establishes a circuit from the right hand or marking contact of the corrector relay 26, direct to the windings of the "make" relay 55 as follows: from positive battery through conductor 58, armature $23^a$, conductor 59, conductor 60, and winding of relay 55 to negative battery. This circuit will be established every time the brush $b'$ passes over one of the even segments and each time the armature of the relay 55 is attracted, a circuit is closed through the winding of the mechanical corrector magnet 57, which results in stepping the brushes of the distributer backward. This will continue until the brushes are again brought into proper phase relation with the transmitter at the sending station, when the brush B' is on the odd segments during the reception of the selecting portion of the signal impulses. The armature $23^a$ will be moved to its back contact under the action of the biasing winding 23ᵇ through which a weak current is constantly flowing. This biasing winding is used instead of a spring.

I have described the several features of my invention particularly is illustrated in the accompanying drawings but I am not limited in the scope or application of this invention except as set forth in the appended claims.

I claim:

1. In a telegraph system, a transmitting station, a receiving station, a signalling line connecting said stations, means at said transmitting station for transmitting a three element code of plus, minus and zero elements, means at said first station for translating said code into two element signals of plus and minus impulses, and means at said second station for re-translating said code of plus and minus impulses into said original code of plus, minus and zero impulses.

2. In a telegraph system, a transmitting station, a receiving station, a tape at said first station perforated to transmit a three element code, means at said first station for translating said three element code into a two element code and means at said second station for translating said two element code into a three element code.

3. In a telegraph system, a transmitting station, a receiving station, a line connecting said stations, a tape perforated with a three element code of plus, minus and zero elements, a repeater relay controlled by said tape for translating said three element code into a two-element code and means at said receiving station responsive to said two-element code.

4. In a telegraphic system, a transmitting station, a receiving station, a tape perforated with the three element code including zero as one of its elements at said transmitting station, a transmitter at said first station controlled by said tape, means at said first station for translating said code into a two element code, a distributer at said second station operating synchronously with said tape-controlled transmitter, circuit arrangements including said distributer for translating said two element code into the original three element code and a recorder responsive to the said three element code.

5. In a telegraph system, a transmitting station, a receiving station, a tape perforated with the three element code including zero as one of its elements at said transmitting station, a transmitter at said first station controlled by said tape, means at said first station for translating said code into a two element code, a distributer at said second station operating synchronously with said tape-controlled transmitter, circuit arrangements including said distributer for translating said two element code into the original three element code, a recorder responsive to the said three element code, and means automatically responsive when said tape runs out for maintaining said transmitter and said distributer in synchronism.

6. In a telegraph system, a transmitting station, a receiving station, a tape perforated with the three element code including zero as one of its elements at said transmitting station a transmitter at said first station controlled by said tape, means at said first station for translating said code into a two element code, a distributer at said second station operating synchronously with said tape-controlled transmitter, circuit arrangements including said distributer for translating said two element code into the original three element code, a recorder responsive to the said three element code, and means automatically responsive when said transmitter and said distributer fall out of synchronism for bringing them back into synchronism.

7. In a telegraph system, a transmitting station, a receiving station, a tape perforated with the three element code including zero as one of its elements at said transmitting station, a transmitter at said first station controlled by said tape, means at said first station for translating said code into a two element code, a distributer at said second station operating synchronously with said tape-controlled transmitter, circuit arrangements including said distributer for translating said two element code into the original three element code, a recorder responsive to the said three element code, and means automatically responsive when said tape runs out whereby a predetermined combination of said two element code in periodically transmitted for maintaining said transmitter and said distributer in synchronism.

8. In a telegraph system, a transmitting station, a receiving station, a line connecting said stations, a three element code transmitter at said transmitting station, a three element receiver at said receiving station, means whereby said transmitter controls said receiver over said line, and means whereby only a two element code is transmitted over said line.

9. The method of transmitting telegraph signals which comprises making a tape record of a three element code, translating said three element code into a two element code, transmitting said two element code to a receiving station, translating said two element code into its original form as a three element code and operating a recorder with said three element code.

In testimony whereof I affix my signature.

CRESCENT F. NELSON.